(12) United States Patent
Mueller et al.

(10) Patent No.: US 8,944,114 B2
(45) Date of Patent: Feb. 3, 2015

(54) MORTAR-COATED STEEL PIPES AND METHODS OF MAKING THE SAME

(75) Inventors: Richard I. Mueller, Rancho Cucamonga, CA (US); Ralph S. Friedrich, Hermosa Beach, CA (US); Qizhong Sheng, Cerritos, CA (US)

(73) Assignee: Ameron International Corporation, Houston, TX (US)

( * ) Notice: Subject to any disclaimer, the term of this patent is extended or adjusted under 35 U.S.C. 154(b) by 292 days.

(21) Appl. No.: 13/158,335

(22) Filed: Jun. 10, 2011

(65) Prior Publication Data

US 2012/0315095 A1   Dec. 13, 2012

(51) Int. Cl.
*F16L 1/028* (2006.01)
*F16L 9/14* (2006.01)
*F16L 58/06* (2006.01)
*F16L 58/10* (2006.01)

(52) U.S. Cl.
CPC . *F16L 9/14* (2013.01); *F16L 58/06* (2013.01); *F16L 58/1063* (2013.01)
USPC ........... 138/143; 138/144; 138/146; 138/150; 427/403

(58) Field of Classification Search
CPC ......... F16L 9/14; F16L 58/06; F16L 58/1054; F16L 58/1063
USPC ................. 138/143–146, 140, 141, 150, 154; 427/403; 156/425, 429–431, 450, 458
See application file for complete search history.

(56) References Cited

U.S. PATENT DOCUMENTS

| | | | |
|---|---|---|---|
| 1,513,723 A | 10/1924 | Bohlander | |
| 1,979,656 A | 11/1934 | Whitman | |
| 4,142,555 A | 3/1979 | Satake et al. | |
| 4,366,792 A | 1/1983 | Deleris | |
| 4,366,972 A * | 1/1983 | Franklin | 285/55 |
| 4,611,635 A | 9/1986 | Jarvis | |
| 4,632,720 A | 12/1986 | Meyer et al. | |
| 4,743,142 A | 5/1988 | Shiraishi et al. | |
| 5,271,974 A | 12/1993 | Upchurch | |

(Continued)

FOREIGN PATENT DOCUMENTS

| | | |
|---|---|---|
| AU | 471612 B2 | 4/1976 |
| DE | 3628776 A1 | 3/1988 |

(Continued)

OTHER PUBLICATIONS

International Search Report/Written Opinion Dated Aug. 10, 2012 from related PCT Application No. PCT/US2012/041748.

*Primary Examiner* — J. Casimer Jacyna
(74) *Attorney, Agent, or Firm* — Snell & Wilmer L.L.P.

(57) ABSTRACT

Mortar-coated steel pipe comprise a steel cylinder having a mortar layer disposed therein, such mortar layer being free of any metallic reinforcement. An overcoat is disposed over the mortar layer and is formed from a material that is a dielectric and/or a barrier to moisture and oxygen entering the mortar layer, e.g., a polymeric material. The pipe may include a further concrete or mortar layer disposed over the overcoat, forming an outermost pipe surface. The outer layer can be cement, mortar, or other material. The mortar layer thickness is about 2 to 30 mm, the overcoat thickness is about 0.1 to 2 mm, and any outer layer thickness is about 1.2 to 4 cm. The pipe is made by compression coating method, where mortar layer and overcoat are applied simultaneously. When an outer layer is desired, it is preferably applied at the same time as the mortar layer and overcoat.

44 Claims, 6 Drawing Sheets

(56) References Cited

U.S. PATENT DOCUMENTS

| | | | |
|---|---|---|---|
| 5,543,188 | A | 8/1996 | Te'eni |
| 5,573,040 | A | 11/1996 | Schumacher et al. |
| 5,667,623 | A | 9/1997 | Hanson |
| 5,888,339 | A | 3/1999 | Hanson |
| 6,706,350 | B2 | 3/2004 | Sato et al. |
| 7,267,507 | B2 | 9/2007 | Lecinq et al. |
| 7,673,432 | B2 | 3/2010 | Teng |
| 2009/0084457 | A1 | 4/2009 | Tsuchie et al. |
| 2009/0250135 | A1 | 10/2009 | Friedrich et al. |

FOREIGN PATENT DOCUMENTS

| | | |
|---|---|---|
| DE | 3828427 A1 | 3/1990 |
| EP | 0271239 A1 | 6/1988 |
| FR | 2898178 A1 | 9/2007 |
| GB | 2004971 A | 4/1979 |
| JP | 2009085414 A | 4/2009 |

* cited by examiner

US 8,944,114 B2

MORTAR-COATED STEEL PIPES AND METHODS OF MAKING THE SAME

FIELD OF THE INVENTION

This invention relates to mortar-coated steel pipes and, more particularly, to steel pipes with mortar coatings that are specially engineered to provide barrier properties that enhance corrosion resistance, by preventing unwanted migration of chlorides, moisture and oxygen to and/or through the mortar material, and/or to resist internal crack-propagation, and do so in a manner that promotes manufacturing efficiency.

BACKGROUND OF THE INVENTION

Conventional concrete-coated steel pipes comprise a steel cylinder having a layer of concrete disposed over an outside surface of the steel cylinder. A technique used for making such conventional concrete-coated steel pipes is by weight coating method, which involves placing the steel cylinder onto a conveyor belt, and helically winding concrete and wire mesh around an outer surface of the steel cylinder. The resulting concrete-coated steel pipe thereby comprises a concrete layer disposed around the steel cylinder, which concrete layer includes the wire mesh disposed therein. A temporary layer of plastic material may be wrapped around the concrete layer to preserve the moisture content in the concrete to facilitate curing of the concrete, which plastic material is removed before the concrete-coated steel pipe is placed into service.

While such conventional concrete-coated steel pipes are capable of providing some degree of corrosion protection to the underlying steel cylinder, the level of corrosion protection will vary depending on the rate of chloride, moisture and oxygen diffusion through the concrete layer. The rate of chloride, moisture and oxygen diffusion through the concrete layer can vary depending on such factors as the thickness of the concrete layer, the specific formulation of the concrete layer, and the integrity of the concrete layer itself. For example, a concrete layer having cracks or other structural defects, e.g., caused when made, when transported, or when placed in certain end-use services or applications, will provide a high level of chloride, moisture and oxygen diffusion, thereby offering a low level of corrosion resistance to the underlying steel cylinder that will adversely effect service life. Another example is that of the concrete being subjected to cyclic wetting with chloride-containing water, then drying. Such cyclic wetting and drying will concentrate chlorides near the steel surface, and pump oxygen through the concrete, the combined action of which will eventually negate the passivating effect of high-pH concrete on steel and cause the steel to corrode.

It is, therefore, desired that an improved pipe be developed that is capable of being used in place of conventional concrete-coated steel pipe, and that is engineered to provide an improved degree of corrosion resistance when placed into typical end-use applications. It is also desired that such improved pipe be engineered in a manner that provides an improved degree of crack propagation resistance, to thereby both ensure the structural stability of the pipe and to operate as an additional mechanism to provide improved corrosion resistance. It is further desired that such improved pipe be manufactured in a manner that is efficient and cost effective.

SUMMARY OF THE INVENTION

Mortar-coated steel pipes and methods for making the same are disclosed herein. In an example embodiment, such mortar-coated steel pipes comprise a steel cylinder having an outer surface. The steel cylinder may or may not include a nonmetallic material lining the same. A mortar layer is disposed over the outer surface. In an example embodiment, the mortar layer is in direct contact with the steel cylinder. The mortar layer is preferably free of wire mesh or other form of metallic reinforcement. The mortar layer may also be free from aggregate material and consist essentially of cement and water.

An overcoat is disposed over the mortar layer to form a continuous layer thereon. The overcoat is formed from a material different from the mortar layer, and that operates as a dielectric and/or to provide a barrier to moisture and oxygen entering and penetrating into the mortar layer. In an example embodiment, the overcoat is formed from a polymeric material, such as a plastic material which can be provided in a preformed state, e.g., in the form or a sheet or wrap, or can be provided in a non-preformed state, e.g., in the form of a liquid, spray, or hot melt. When provided in sheet form, the overcoat can be disposed in a helical or longitudinal fashion over the mortar layer. If desired, the overcoat can have a surface that has been treated or otherwise configured to provide an improved mechanical attachment with the mortar layer. An adhesive material can be interposed between the mortar layer and overcoat. In an example embodiment, the mortar layer has a thickness in the range of from about 2 to 30 mm, and the overcoat has a thickness in the range of from about 0.1 to 2 mm.

The mortar-coated steel pipe may include a further layer of material disposed over the overcoat, in which case the overcoat becomes an intermediate layer. In such embodiment, the pipe includes an outer layer disposed over the overcoat, wherein the outer layer forms an outermost surface of the pipe. Suitable outer layer materials include cement, mortar, and combinations thereof, or other material selected to reduce the effects of impact on the intermediate layer. In such embodiment, the mortar layer has a thickness in the range of from about 2 to 30 mm, the overcoat or intermediate layer has a thickness in the range of from about 0.1 to 2 mm, and the outer layer has a thickness in the range of from about 1.2 to 4 cm.

Mortar-coated steel pipes as disclosed herein are made by applying a mortar layer onto an outer surface of a steel cylinder, and applying an overcoat onto an outer surface of the mortar layer. In a preferred embodiment, the overcoat forms a continuous layer that operates to fully cover or encapsulate the underlying mortar layer. In an example embodiment, the overcoat is applied before the mortar layer has cured. Preferably, the mortar layer and overcoat are applied simultaneously by compression coating technique, wherein the overcoat operates as a vehicle for applying the mortar layer. According to such method, before the step of applying the mortar layer, a mortar material is applied onto a surface of material forming the overcoat, and the combined mortar layer and overcoat are together delivered to the steel cylinder. In an example embodiment, a vibrator or the like is used to further consolidate the mortar layer once it's applied to the steel cylinder. In the case where the pipe includes an outer layer over the overcoat, such outer layer can also be applied at the same time as the mortar layer and overcoat by compression coating technique, e.g., via a film material for carrying and applying the outer layer material.

Mortar-coated steel pipes as disclosed herein take the place of conventional concrete-coated steel pipe, and are engineered to provide an improved degree of corrosion resistance when placed into typical end-use applications. Such mortar-coated steel pipes are engineered in a manner that provides an improved degree of crack propagation resistance, to thereby both ensure the structural stability of the pipe and to operate as an additional mechanism to provide improved corrosion resistance. Further, such pipes are manufactured in a manner that is efficient and cost effective.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Improved mortar-coated steel pipes (MCSPs), and methods for making the same as disclosed herein, comprise a steel cylinder having a layer of mortar material disposed thereover, and further including an overcoat disposed around the mortar layer. The mortar layer is substantially free of any wire lathing or metal reinforcement, and the overcoat is formed from a material that acts as a barrier to chloride, oxygen and moisture entering the mortar layer, thereby providing an improved degree of corrosion resistance. MCSPs as disclosed herein may optionally include a further layer of mortar and/or concrete material disposed over the overcoat, in which case the overcoat also operates to control crack propagation within the MCSP construction. In an example embodiment, MCSPs disclosed herein are preferably made by compression technique, wherein the mortar and overcoat layers are applied simultaneously to promote manufacturing efficiency, although other techniques can likewise be used to apply such layers.

As used herein, the term "mortar" is understood to mean a mixture of cement and water, with or without sand that does not include aggregate material having a size of greater than about 8 mm, and that if sand is included, the sand will make up between approximately 65 to 75 percent by weight of the total weight of the mortar.

Figure 1:
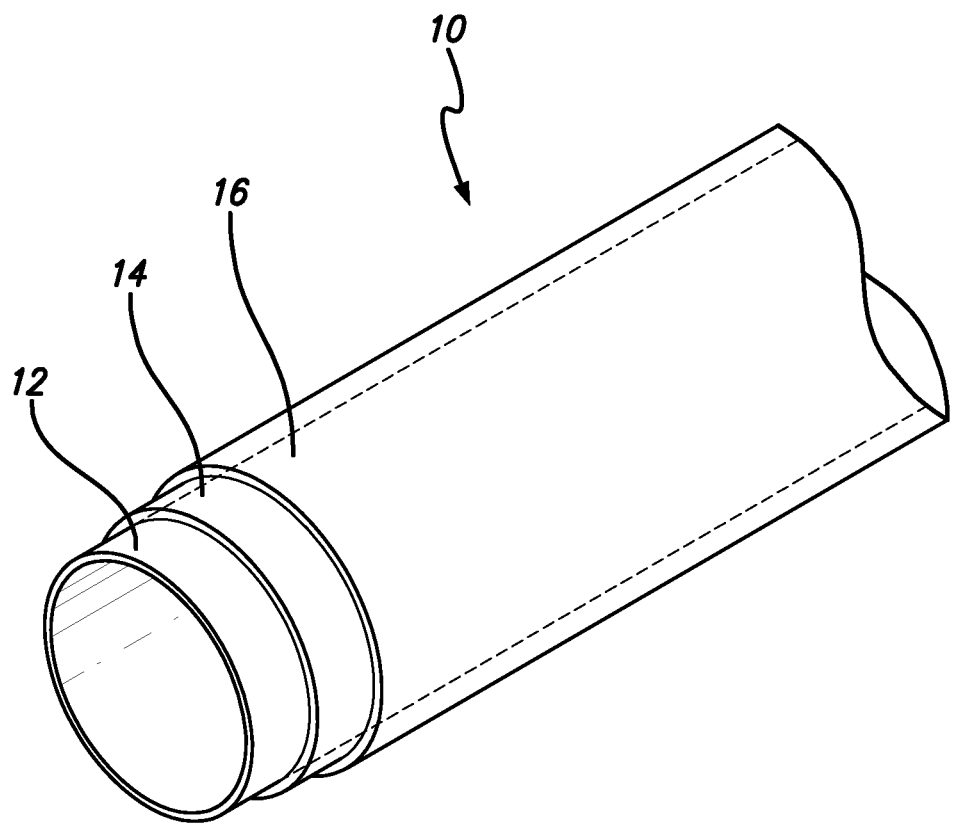
FIG. 1 is a perspective side view of a first example embodiment improved mortar-coated steel pipe.
Figure 2:
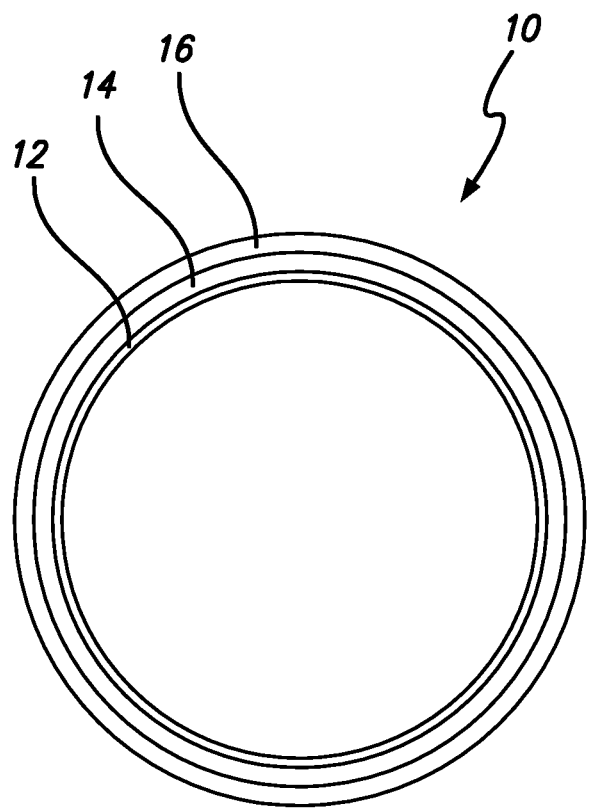
FIG. 2 is a cross-sectional end view of the improved mortar-coated steel pipe of FIG. 1.

FIG. 1 illustrates a first embodiment MCSP 10 that has been provided to show the different layers of materials used to form the same. It is to be understood that this figure is provided for reference purposes, and that MCSPs of this first embodiment comprise the different material layers extending completely to and terminating at each of the opposed axial ends. FIG. 2 is a cross-section of the MCSP of FIG. 1, provided to further illustrate the arrangement of MCSP construction material layers.

The MCSP 10 comprises a steel cylinder 12 defining an inside diameter of the coating for the MCSP, which can be provided in desired lengths from suppliers known to provide steel pipe. The steel cylinder thickness and diameter can and will vary depending on the particular end-use application. Although not shown, the steel cylinder may optionally include a liner disposed along its inside diameter, which liner can be formed from mortar, concrete, polymeric, combinations thereof, or other materials depending on the particular end-use application.

A mortar layer 14 is disposed over an outside surface of the steel cylinder 12. In a preferred embodiment, the mortar layer is a continuous layer that completely surrounds or encapsulates the steel cylinder. The mortar layer 14 has a thickness that varies depending on the end-use application. In an example embodiment, the thickness of the mortar layer is in the range of from about 2 to 30 mm, preferably in the range of from about 3 to 10 mm. The mortar layer operates to passivate the underlying surface of the steel cylinder, thereby protecting it from corrosion when placed into service.

A feature of the MCSPs as disclosed herein is that they can be made in a manner avoiding the use of metal reinforcement elements, e.g., such as wire mesh, lathing, or the like, in the mortar layer. While such elements can be used, preferred embodiments of the MCSPs disclosed herein are free of any such metal reinforcing elements. If desired, the mortar layer can contain non-metallic reinforcing elements to lend certain desired performance properties Mortar material useful for forming the mortar layer 14 can be provided from suppliers known to provide mortar material for other types of pipe constructions.

An overcoat 16 is disposed over an outside surface of the mortar layer 14, and is formed from a material that is different from that of the mortar layer. In a preferred embodiment, the overcoat extends along the entire surface of the mortar layer to form a continuous layer thereover. The overcoat is formed from a material that is capable of performing as a barrier to prevent the unwanted passage of chlorides, oxygen and moisture to the mortar layer. Additionally, it is desired that the overcoat be formed from a material having desired dielectric properties to prevent large amounts of current from bleeding through the mortar layer, thereby enabling the MCSP to require less or avoid altogether cathodic protection current when in service, e.g., when buried in a soil environment.

In an example embodiment, the overcoat 16 can be selected from polymeric materials, e.g., durable plastics. Example polymeric materials useful for forming the overcoat include polyethylenes, polypropylenes, polyvinylchorides, polyurethanes, polyureas, epoxies, and the like. In a preferred embodiment, the overcoat is formed from polyethylenes. It is to be understood that the thickness of the overcoat can and will vary depending on such factors as the type of material selected to form the overcoat, the size, weight, and the end-use application of the MCSP. In an example embodiment, the thickness of the overcoat is in the range of from about 0.01 to 0.20 cm, preferably in the range of from about 0.02 to 0.10 cm. As noted above, the overcoat operates as a barrier to prevent the unwanted migration of moisture, chlorides, and oxygen.

A feature of MCSPs disclosed herein is the use of the overcoat to provide the desired barrier properties within the MCSP construction. Conventional concrete-coated steel pipes do not include this barrier element, and thus must otherwise provide the desired degree of corrosion resistance through the thickness of the concrete layer. The presence of the overcoat in the MCSP thus operates to reduce the thickness of the mortar layer, when compared to conventional concrete-coated steel pipe, to that calculated to provide a desired level of corrosion resistance when taken in combination with the overcoat. As a result, the mortar layer thickness in MCSPs as disclosed herein are generally less than that of the concrete layer in conventional concrete-coated steel pipe, thereby reducing material costs and pipe weight.

As described in greater detail below, the overcoat can be provided in the form of a preformed film, or can be applied in non-preformed form such as in the form of an extrusion, a liquid or a spray that cures to form the continuous layer. In the event that the overcoat is applied in the form of a preformed film, it may be applied in the form of a single sheet, or in the form of multiple sheets, wherein the sheet or sheets, e.g., along adjacent sheet edges or the like, are bonded, fused, adhered, or overlapped together to form a continuous layer to thereby provide the desired barrier function.

The interface between the mortar layer and the overcoat can be enhanced by surface treating one or both of the adjacent mortar and overcoat surfaces. Known surface treatment techniques, e.g., for increasing the surface area or the like of the surface(s) to provide an improved mechanical interconnection between the adjacent surfaces, can be used in this regard. For example, the overcoat can be treated to have a plurality of fibrous hooks thereon for the purpose of providing an enhanced mechanical interconnection with the mortar layer. Additionally, or alternatively, chemical agents such as adhesives or the like can be interposed between the adjacent mortar layer and overcoat surfaces to provide an improved interface therebetween.

A feature of the overcoat is that it is a permanent element of the MCSP that operates to provide desired barrier and dielectric properties when the pipe is placed into an end-use application, e.g., when the pipe is buried in the ground or placed underwater.

Figure 3:
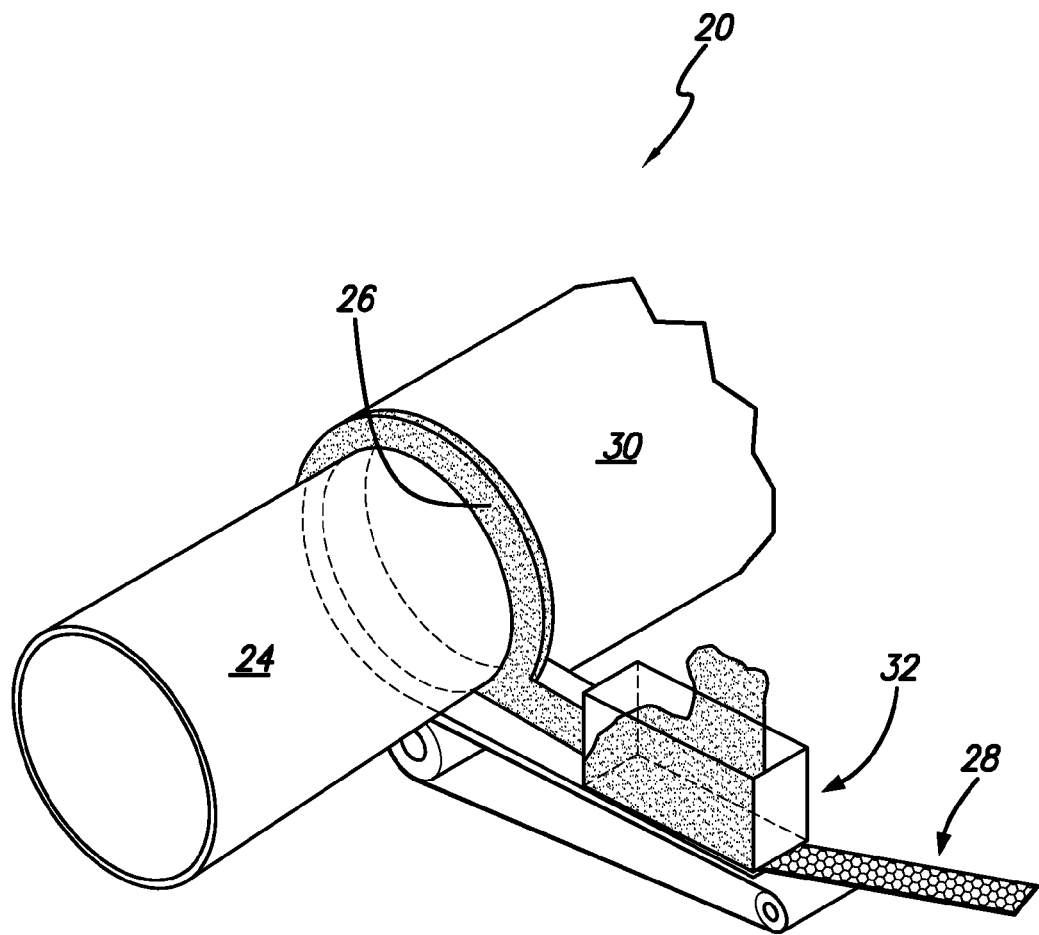
FIG. 3 is a perspective side view of an example method of making the improved mortar-coated steel pipe of FIGS. 1 and 2.

FIG. 3 illustrates an example method of making an MCSP 20 as disclosed herein. In this example embodiment, the MCSP is made by compression technique, wherein the mortar layer 22 is compressed onto the steel cylinder 24 to provide a desired mortar layer thickness. Generally, according to the compression method, a desired thickness of the mortar material 26 is first disposed onto a preformed film 28 used to form the overcoat 30, and the preformed film now carrying the mortar material is positioned beneath the steel cylinder 24 to place the mortar material into contact therewith. The preformed film 28 is used to deliver the mortar material onto the surface of the steel cylinder, and forms the overcoat 30. During and/or subsequent to the delivery process, the mortar layer 22 is compressed into place against the steel cylinder to provide the desired mortar layer thickness.

In the example embodiment illustrated in FIG. 3, the mortar material and performed film are applied through the use of one or more application stations 32 positioned radially along the steel cylinder. In this embodiment, the application station is configured to dispense the mortar material and preformed film onto the steel cylinder in helical fashion as the steel cylinder is rotated and passed longitudinally along the station, e.g., by conveyor belt, or alternatively, as the station passes longitudinally along the pipe as the pipe is rotated in a lathe, at a desired rate of rotation and longitudinal movement. In an example embodiment, the application station is positioned so that the preformed film runs onto the conveyor belt running under the rotating MCSP.

Figure 6:
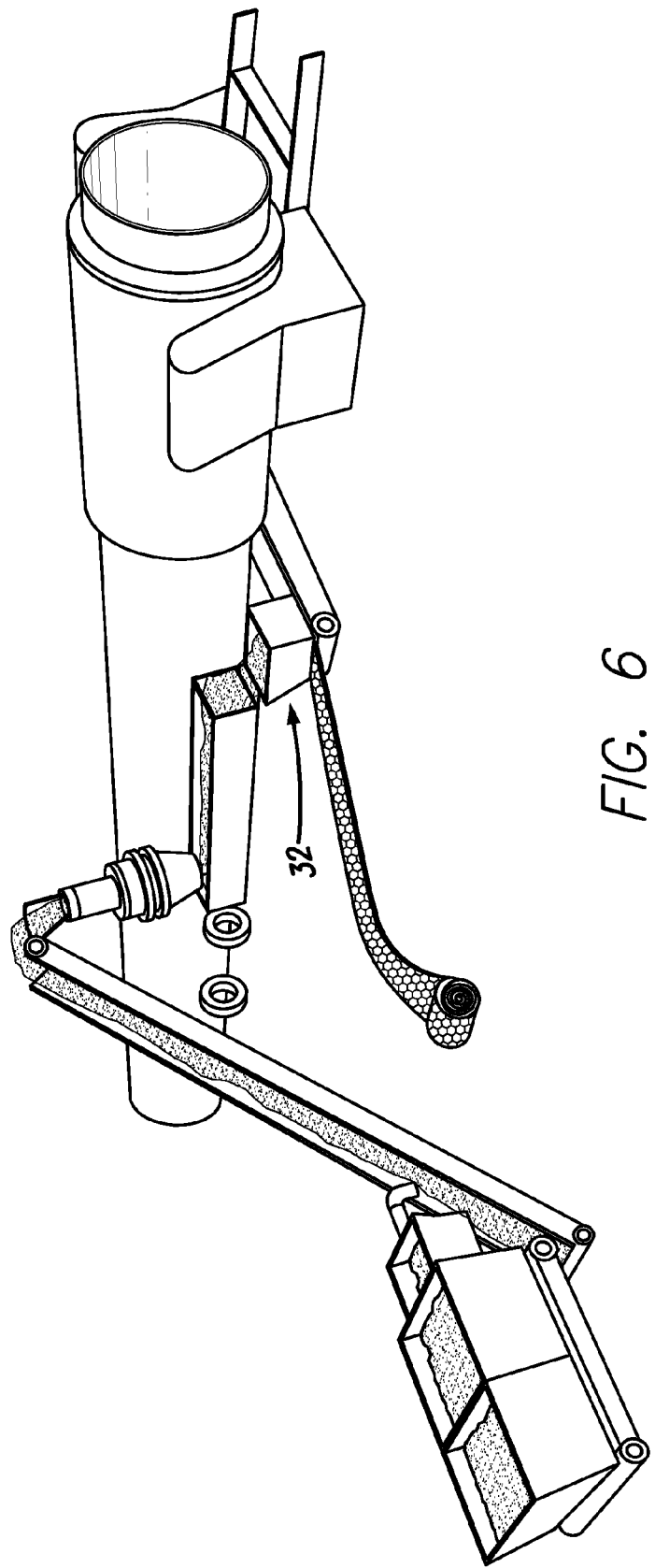
FIG. 6 is a perspective side view of an example method of making the improved mortar coated steel pipes of FIGS. 1, 2, 4 and 5.

FIG. 6 provides a further illustration of the method used to make MCSPs as disclosed herein, comprising the application station 32 noted above. In this illustrated embodiment, the manufacturing equipment also includes a conveyor for transporting the mortar material from a mixing bin or the like to the application station.

In such example embodiment, the preformed film is helically wound around the steel cylinder so that the longitudinal edge of a to-be-applied film wrap abuts, contacts, or overlaps a longitudinal edge of an already-applied film wrap to promote forming the desired continuous overcoat. The adjacent edges can be bonded, fused, adhered, and/or overlapped to provide the desired continuous overcoat. A feature of applying the mortar layer and overcoat together is that, when applied, the preformed film operates to prevent the mortar layer from otherwise bonding to the conveyor belt running under the MCSP.

The desired compression force imposed on the mortar layer can be provided at the point of introducing the mortar material to the steel cylinder, e.g., at the nip or gate downstream from the application station by imposing a desired wind tension, and/or subsequently thereto by compression by the contact of a conveyor or the like against the overcoat and MCSP outer surface by the weight of the MCSP.

Alternatively, the mortar material can be applied longitudinally onto the steel cylinder in a single pass, through the use of multiple mortar material application stations positioned radially around the steel cylinder, wherein each application station comprises a feed of mortar material and preformed film to provide the same in the form of a longitudinal strip, and wherein the several preformed films of the longitudinal strips are bonded or overlapped together to form the continuous overcoat. This is but one alternative approach for applying the mortar material by compression technique. Other approaches that include the feature of placing the mortar material into a compression interface with the steel cylinder are understood to be within the scope of this invention.

In a preferred embodiment, the mortar layer and overcoat is formed by compression technique as illustrated in FIG. 3, wherein the mortar material is applied onto a preformed film that is then applied in helical fashion onto the steel cylinder. The width of the preformed film winding used for this preferred method of making can vary depending on a number of factors such as the available manufacturing equipment, the type and/or thickness of the preformed film used to form the overcoat, the desired mortar layer thickness, the diameter of the MCSP, and the end-use application. In an example embodiment, the preformed film width is in the range of from about 15 to 50 cm, preferably in the range of from about 20 to 40 cm.

If desired, the preformed film may be reinforced or fortified to enable achieving a desired tension force to thereby deliver the desired compression force onto the mortar layer. In an example embodiment, the preformed film may further comprise oriented laminations, or a fabric element, a plurality of random fibers, a mesh element, combinations thereof or the like that operate to increase the tensile strength of the film. Such elements may be metallic or nonmetallic. Alternatively, instead of being integral and part of the preformed film, such reinforcing feature can be provided in the form of a separate member or element, such as a fabric element, a mesh element, combinations thereof or the like that operate to increase the tensile strength of the film, that is disposed over the preformed film.

The rotational speed of the steel cylinder and the relative longitudinal movement between the steel cylinder and the application station in this preferred method of making can likewise depend on a variety of factors such as the available manufacturing equipment, the type and/or thickness of the preformed film used to form the overcoat, the desired mortar layer thickness, the diameter of the MCSP, and the end-use application. In a preferred embodiment, the rotational and longitudinal speeds are controlled to provide a desired mortar layer helical wind angle necessary to match the combination of overcoat film width and pipe diameter.

In an example method of making, a vibrator or the like may be used to consolidate the mortar layer. In a preferred embodiment, a vibrator is positioned near the application station to better consolidate the mortar material as it is applied to the steel cylinder. If desired, the application station and vibrator can be consolidated into a single piece of equipment. Additionally, one or more vibrators can be positioned downstream from the application station if so desired.

Alternatively, instead of applying the mortar layer and overcoat together by the compression technique described above, the mortar layer can be first be applied to the steel cylinder, e.g., by conventional process, and the overcoat can be subsequently be applied to the surface of the mortar layer in a preformed or a non-preformed state, e.g., in the form of an extrusion, liquid, or spray. When applied in a non-preformed state, the material used to form the overcoat would be applied to an outside surface of the mortar layer in a manner that when cured forms a continuous overcoat layer. This can be done by applying it in a helical or longitudinal fashion. In an example embodiment, a thickness of overcoat material for the form of polyethylene or the like can be sprayed onto the mortar layer and allowed to cure by cooling.

Figure 4:
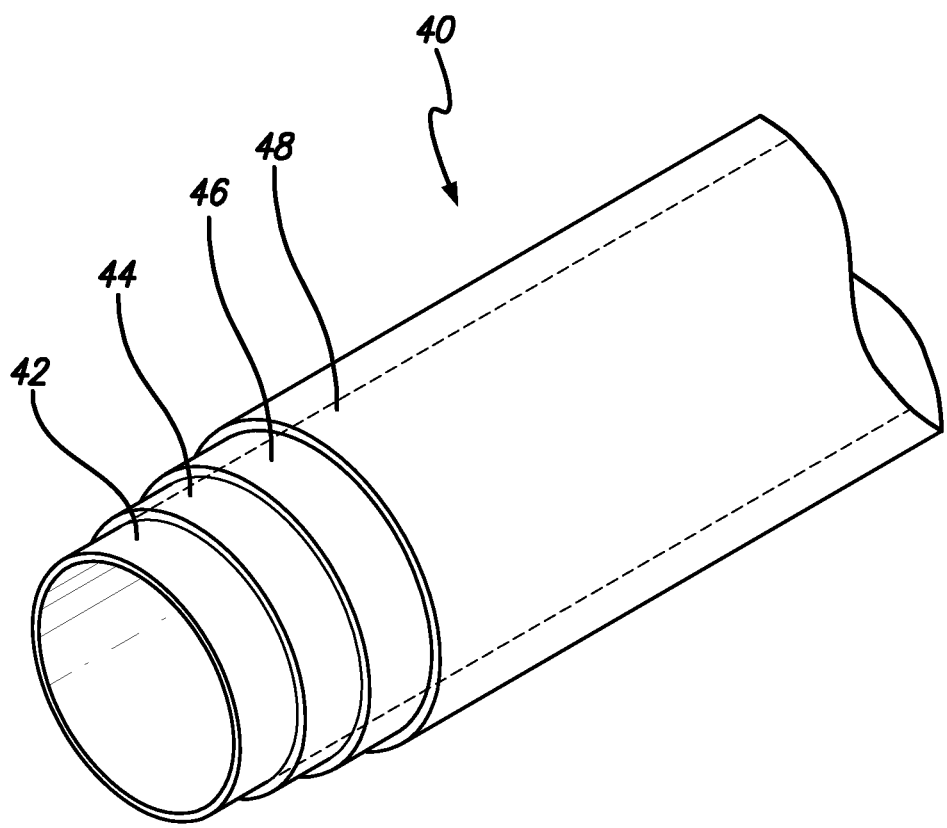
FIG. 4 is a perspective side view of a second example embodiment improved mortar-coated steel pipe.
Figure 5:
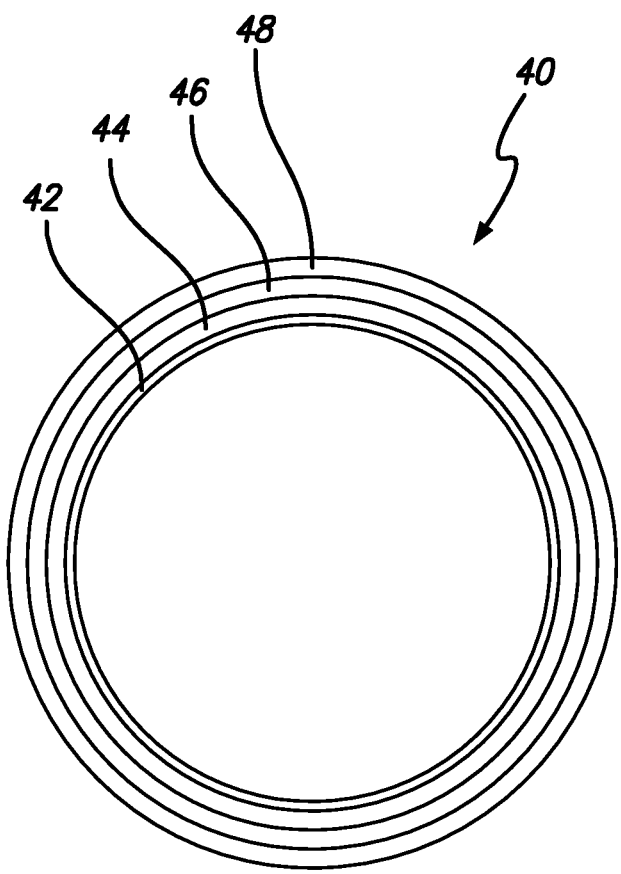
FIG. 5 is a cross-sectional end view of the improved mortar-coated steel pipe of FIG. 4.

FIG. 4 illustrates a second embodiment MCSP 40 that has been provided to show the different layers of materials used to form the same. It is to be understood that this figure is provided for reference purposes, and that MCSPs of this second embodiment comprise the different material layers extending completely to and terminating at each of the opposed axial ends. FIG. 5 is a cross-section of the MCSP of FIG. 4, provided for further illustrating the arrangement of MCSP construction material layers.

The MCSP 40 comprises a similar arrangement of the steel cylinder 42, the mortar layer 44, and the overcoat 46 as described above with reference to the first embodiment MCSP (illustrated in FIGS. 2 and 3). However, unlike the first embodiment MCSP, the second embodiment MCSP 40 additionally includes a further outer layer 48 disposed over the overcoat 46. For this reason, the overcoat 46 in this second embodiment MCSP is hereinafter to be referred to as an intermediate layer.

In an example embodiment, the outer layer 48 is formed from a material different from that of the intermediate layer 46. Suitable materials useful for forming the outer layer include those capable of contributing to the structural integrity of the MCSP, in terms of enhancing resistance to tensile stress, hoop stress, compression stress, and/or bending stress, and/or those capable of providing structural protection for the underlying intermediate layer. Such suitable materials include mortar, concrete, combinations thereof, or other material selected to reduce the effects of impact on the intermediate layer. If mortar or concrete are used, the outer layer may be reinforced with continuous steel wire, wire mesh, intermixed wire bristles, intermixed plastic fibers, intermixed polymers, or other material to increase the tensile strength of the outer layer mortar or concrete.

The steel cylinder 42, mortar layer 44, and intermediate layer 46 for this second embodiment MCSP are formed from the same materials having the same dimensions as described above for the first embodiment MCSP. In a preferred embodiment, the outer layer 48 is formed from mortar. In such preferred embodiment, the outer layer 48 has a thickness that is greater than that of the mortar layer 44. Generally, the outer layer 48 has a thickness in the range of from about 1.2 cm to 4.0 cm, and preferably in the range of from about 1.8 to 2.5 cm.

A feature of the second embodiment MCSP is that the intermediate layer 46 operates not only as described above, as a barrier to chloride, moisture and oxygen penetration and as a dielectric, but it also operates to blunt or stop cracks from propagating between the mortar layer 44 and the outer layer 48. The intermediate layer functions to prevent cracks that start in either layer from continuing into the other layer, thereby both enhancing the structural integrity of the MCSP and further enhancing corrosion resistance, as the unchecked propagation of such cracks can otherwise provide a travel path for moisture, chloride, and oxygen to the underlying steel cylinder.

The second embodiment MCSP can be formed in a manner similar to that described above for the first embodiment MCSP, e.g., by compression technique using the same machinery as described above for the first embodiment MCSP, wherein the mortar layer and intermediate layer are applied to the steel cylinder simultaneously. In an example method of making, the outer layer is also applied using the compression technique by applying the outer layer material onto a further preformed film, then is delivered onto the surface of the intermediate layer. This can be done helically or longitudinally as described before.

Additionally, the outer layer can be applied at the same time as applying the mortar layer and intermediate layer through the use of an application station configured to provide simultaneous deposition of the mortar material and outer layer material onto respective sequentially positioned preformed films for the intermediate layer and outer layer. Alternatively, the outer layer material can be applied separately. In either case, the preformed film that is used to accept and deliver the outer layer is one that is sacrificial or temporary, and is provided to function temporarily as an application vehicle for the outer layer and a moisture barrier to prevent the outer layer mortar from desiccation prior to curing, thus can be removed from the MCSP prior to being put into service.

A feature of MCSPs disclosed herein is that they are specifically engineered to provide an enhanced degree of corrosion resistance, and/or crack propagation control, through the use of the overcoat and/or intermediate layer, when compared to conventional concrete-coated steel pipes. Further, MCSPs disclosed herein do so in a manner that avoids the use of a thick inner mortar layer, the use of concrete, and the need to use metal reinforcing members in the inner mortar layer, thereby reducing manufacturing/materials cost and improving manufacturing efficiency. Still further, MCSPs as disclosed herein are made using a compression method, which promotes the simultaneous formation and application of the MCSP construction layers, which operates to further enhance manufacturing efficiency and reduce manufacturing costs.

Other modifications and variations of MCSPs, and methods for making the same, according to the principles of this invention will be apparent to those skilled in the art. It is, therefore, to be understood that within the scope of the appended claims this invention may be practiced otherwise than as specifically described.

What is claimed is:

1. A mortar-coated steel pipe comprising:
   a steel cylinder having an outer surface;
   a mortar layer disposed over the outer surface in a helical pattern extending along a the outer surface;
   an overcoat disposed over the mortar layer to form a continuous encapsulating layer thereon to provide a barrier to moisture and oxygen penetrating into the mortar layer, wherein the overcoat has the same helical pattern as the underlying mortar layer and is in the form of a preformed polymeric film selected from the group or materials consisting of polyethylenes, polypropylenes, polyvinylchlorides, polyurethanes, polyureas, epoxies, and combinations thereof, wherein the polymeric film is in direct contact with an outer surface of the mortar layer; and an outer layer disposed over the overcoat and in direct contact with the polymeric film, the outer layer forming an outermost surface of the pipe and having a thickness greater than the mortar layer, wherein the outer layer is selected from the group of materials consisting of cement, mortar, and combinations thereof, wherein the mortar layer has a thickness in the range of from about 2 to 30 mm, and wherein the overcoat has a thickness in the range of from about 0.1 to 2 mm.

2. The pipe as recited in claim 1 wherein the overcoat is formed from a polyethylene material.

3. The pipe as recited in claim 1 wherein the mortar layer is free of wire mesh or other form of metallic reinforcement.

4. The pipe as recited in claim 1 wherein the mortar layer is free from aggregate material and is comprised only of cement and water.

5. The pipe as recited in claim 1 wherein the overcoat includes a surface that is treated to enhance its interface with the mortar layer.

6. The pipe as recited in claim 1 comprising a bonding agent interposed between the overcoat and the mortar layer.

7. The pipe as recited in claim 1 wherein the outer layer has a thickness in the range of from about 1.2 to 4 cm.

8. The pipe as recited in claim 1 wherein the overcoat comprises surface features operating to provide a mechanical attachment with the mortar layer.

9. A mortar-coated steel pipe comprising:
a steel cylinder having an outer surface;
a mortar layer covering the outer surface;
an intermediate layer covering an outer surface of the mortar layer to form a continuous layer thereon encapsulating the mortar layer; and
an outer layer covering an outer surface of the intermediate layer, the outer layer forming an outermost surface of the pipe, wherein the outer layer is formed from the group of materials consisting of cement, mortar, and combinations thereof, and wherein the outer layer has a thickness that is greater than the mortar layer;
wherein the intermediate layer is a polymeric film that is in direct contact with both the outer layer and the mortar layer, and that reduces crack propagation between the outer layer and mortar layer, wherein the mortar layer has a thickness in the range of from about 2 to 30 mm, and wherein the intermediate layer has a thickness in the range of from about 0.1 to 2 mm.

10. The pipe as recited in claim 9 wherein the mortar layer is free of wire mesh or other metallic reinforcement.

11. The pipe as recited in claim 9 wherein the mortar layer is free of aggregate material.

12. The pipe as recited in claim 9 wherein the intermediate layer is formed from group of polymeric material consisting of polyethylenes, polypropylenes, polyvinylchlorides, polyurethanes, polyureas, epoxies, and combinations thereof.

13. The pipe as recited in claim 12 wherein the intermediate layer is formed from a polyethylene material.

14. The pipe as recited in claim 9 wherein the intermediate layer is formed from a polymeric material that is applied to the mortar layer in a semi-liquid form using an extrusion process.

15. The pipe as recited in claim 9 wherein the polymeric material is applied in the form of a preformed film and disposed in a helical fashion around the mortar layer.

16. The pipe as recited in claim 9 wherein the polymeric material includes a surface that is treated to enhance its interface with the mortar layer.

17. The pipe as recited in claim 9 wherein the outer layer has a thickness in the range of from about 1.2 to 4 cm.

18. The pipe as recited in claim 9 wherein the polymeric material has a surface comprising features that provide a mechanical attachment with the mortar layer.

19. A method for making a mortar-coated steel pipe comprising;
applying a mortar layer onto an outer surface of a steel cylinder;
applying an overcoat onto an outer surface of the mortar layer to form a continuous layer thereon encapsulating the mortar layer, wherein the overcoat is provided in the form of a preformed polymeric film in direct contact with the mortar layer and is selected from the group of materials consisting of polyethylenes, polypropylenes, polyvinylchlorides, polyurethanes, polyureas, epoxies, and combinations thereof, and wherein the overcoat compresses the underlying mortar layer to provide a desired mortar layer thickness; and
applying an outer layer onto on outer surface of the overcoat, wherein the outer layer is selected from the group of materials consisting of cement, mortar, and combinations thereof, wherein the outer layer has a thickness that is greater than the mortar layer, and wherein the mortar layer has a thickness in the range of from about 2 to 30 mm, and wherein the overcoat has a thickness in the range of from about 0.1 to 2 mm.

20. The method as recited in claim 19 wherein the step of applying the mortar layer and the overcoat occurs simultaneously.

21. The method as recited in claim 20 wherein before the step of applying the mortar layer, a mortar material is applied onto a surface of material forming the overcoat.

22. The method as recited in claim 19 wherein the mortar layer is substantially free of wire mesh or other metallic reinforcement.

23. The method as recited in claim 19 wherein the outer layer is in direct contact with the overcoat polymeric film.

24. The method as recited in claim 19 wherein during the step of applying the overcoat, a polymeric material is deposited in spray form over the mortar layer.

25. The method as recited in claim 19 wherein during the step of applying the overcoat, a polymeric material is deposited by extruding a semi-solid form over the mortar layer.

26. The method as recited in claim 19 further comprising vibrating the mortar layer to consolidate it once applied to the steel cylinder.

27. The method as recited in claim 19 wherein the overcoat is applied helically over the mortar layer.

28. The method as recited in claim 19 wherein the overcoat is applied longitudinally over the mortar layer.

29. The method as recited in claim 19 wherein the overcoat is a continuous layer to provide a barrier to moisture and oxygen penetrating into the mortar layer.

30. The method as recited in claim 29 wherein the overcoat operates as a dielectric.

31. The method as recited in claim 19 wherein the outer layer is applied before the mortar layer has cured.

32. The method as recited in claim 19 wherein the outer layer is applied at the same time as the overcoat.

33. The pipe as recited in claim 19 wherein the outer layer has a thickness in the range of from about 1.2 to 4 cm.

34. A method for making a mortar-coated steel pipe comprising;
   applying a mortar layer onto an outer surface of a steel cylinder;
   applying an intermediate layer onto an outer surface of the mortar layer to form a continuous layer thereon encapsulating the mortar layer; and
   applying an outer layer onto an outer surface of the intermediate layer, wherein the outer layer is selected from the group consisting of cement, mortar, and combinations thereof;
   wherein the intermediate layer is formed from a polyethylene material provided in the form of a preformed film, wherein the film is in direct contact with the underlying mortar layer, wherein the outer layer is formed from mortar and has a thickness greater than the mortar layer, wherein the mortar layer has a thickness in the range of from about 2 to 30 mm, the intermediate layer has a thickness in the range of from about 0.1 to 2 mm, and the outer layer has a thickness in the range of from about 1.2 to 4 mm.

35. The method as recited in claim 34 wherein the intermediate layer operates as a dielectric.

36. The method as recited in claim 34 wherein the steps of applying the mortar layer and the intermediate layer occur at the same time.

37. The method as recited in claim 36 wherein before the step of applying the mortar layer, a mortar material is applied onto a surface of the intermediate layer.

38. The method as recited in claim 34 wherein the step of applying the outer layer occurs at same time as applying the intermediate layer.

39. The method as recited in claim 34 wherein the mortar layer is substantially free of wire mesh or other metallic reinforcement.

40. The method as recited in claim 34 further comprising vibrating the mortar layer to consolidate it once applied to the steel liner.

41. The method as recited in claim 34 wherein during the step of applying the intermediate layer a tension is placed on the intermediate layer to compress the underlying mortar layer to achieve a desired mortar layer thickness.

42. The method as recited in claim 34 wherein the intermediate layer is applied helically over the mortar layer.

43. The method as recited in claim 34 wherein the intermediate layer is applied longitudinally over the mortar layer.

44. The method as recited in claim 19 wherein the step of applying the overcoat occurs before the mortar layer has cured.

* * * * *